(12) United States Patent
Harris et al.

(10) Patent No.: US 11,586,655 B2
(45) Date of Patent: Feb. 21, 2023

(54) HYPER-GRAPH LEARNER FOR NATURAL LANGUAGE COMPREHENSION

(71) Applicant: Visa International Service Association, San Francisco, CA (US)

(72) Inventors: Theodore D. Harris, San Francisco, CA (US); Tatiana Korolevskaya, Mountain View, CA (US); Yue Li, San Mateo, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 343 days.

(21) Appl. No.: 16/224,621

(22) Filed: Dec. 18, 2018

(65) Prior Publication Data

US 2019/0188218 A1 Jun. 20, 2019

Related U.S. Application Data

(60) Provisional application No. 62/607,841, filed on Dec. 19, 2017.

(51) Int. Cl.
*G06F 16/33* (2019.01)
*G06F 16/332* (2019.01)
*G06F 16/335* (2019.01)
*G06F 17/27* (2006.01)
*G06N 3/08* (2006.01)
*G06F 16/901* (2019.01)
(Continued)

(52) U.S. Cl.
CPC ........ *G06F 16/3344* (2019.01); *G06F 16/337* (2019.01); *G06F 16/3347* (2019.01); *G06F 16/9024* (2019.01); *G06N 5/02* (2013.01); *G06N 20/00* (2019.01)

(58) Field of Classification Search
CPC .............. G06F 16/3344; G06F 16/337; G06F 16/3347; G06N 20/00; G06N 5/02
USPC .......................................................... 707/723
See application file for complete search history.

(56) References Cited

U.S. PATENT DOCUMENTS 8,463,591 B1 * 6/2013 Chang .................. G06F 40/211
704/9
9,430,463 B2 * 8/2016 Futrell .................... G06F 40/30
(Continued)

FOREIGN PATENT DOCUMENTS

WO 2017075017 A1 5/2017

OTHER PUBLICATIONS

PCT/US2018/066310, "International Search Report and Written Opinion", dated Apr. 5, 2019, 12 pages.

*Primary Examiner* — Usmaan Saeed
*Assistant Examiner* — Earl Levi Elias
(74) *Attorney, Agent, or Firm* — Kilpatrick Townsend & Stockton LLP

(57) ABSTRACT

A method is disclosed. The method includes receiving a text phrase from a user and parsing the text phrase using a natural language parser to generate distinct words. A vector of values relating to the distinct words is generated and compared to vectors in a graph database which relate to learned communities of language. Based on the comparing, a most similar community in the learned communities of language is determined and an action set action set associated with the most similar community is queried. A response to the text phrase from the user is then generated based on the action set and provided to the user.

18 Claims, 6 Drawing Sheets

(51) Int. Cl.
    *G06N 20/00*     (2019.01)
    *G06N 5/02*     (2023.01)

(56) References Cited

U.S. PATENT DOCUMENTS

| | | | |
|---|---|---|---|
| 2007/0016602 A1* | 1/2007 | McCool | G06F 16/335 |
| | | | 707/999.102 |
| 2011/0301941 A1* | 12/2011 | De Vocht | G06F 16/3344 |
| | | | 704/9 |
| 2012/0179682 A1* | 7/2012 | De Saeger | G06F 16/243 |
| | | | 707/E17.09 |
| 2015/0348569 A1* | 12/2015 | Allam | G10L 25/27 |
| | | | 704/257 |
| 2017/0161279 A1* | 6/2017 | Franceschini | G06N 5/022 |
| 2017/0180284 A1* | 6/2017 | Smullen | H04L 69/14 |
| 2017/0199928 A1 | 7/2017 | Zhao et al. | |
| 2017/0206897 A1 | 7/2017 | Jiang et al. | |
| 2018/0054523 A1* | 2/2018 | Zhang | G06F 16/90332 |
| 2018/0081880 A1* | 3/2018 | Kennedy | G06F 16/24578 |
| 2018/0191643 A1* | 7/2018 | Berry | H04L 51/216 |
| 2019/0080627 A1* | 3/2019 | Dey | G09B 19/00 |

* cited by examiner

HYPER-GRAPH LEARNER FOR NATURAL LANGUAGE COMPREHENSION

CROSS-REFERENCES TO RELATED APPLICATIONS

This application is a non-provisional of and claims the benefit of the filing date of U.S. Provisional Application No. 62/607,841, filed on Dec. 19, 2017, which is herein incorporated by reference in its entirety for all purposes.

BACKGROUND

In today's technological environment, it is common for companies to use automatic response generators or "chat bots" to interact with customers. For example, rather than having a human representative assist an inquiring customer, a company can choose to discuss issues with the customer using text messages with which a programmed bot is able to answer routinely asked and relatively straightforward questions.

One method of programming a bot is through machine learning, where a program or model is "trained" using previous data in order to learn appropriate responses to questions. The previous data can be a large dataset of conversations, from which the model can learn patterns for different question and answer combinations. However, there exists a problem in that many techniques, including deep learning, typically do not give any insight into how the link between question and answer has been established by the model. This can be a problem in terms of auditability. Humans need to gain better insight into how a model is learning and need to be sure that the program is dependable and meets compliance. For example, a bot may deal with answering questions regarding financial information such as evaluating accounts and lending credit. Humans that monitor the bot can have a way to assess that the bot will reliably give a consistent response. Yet, at the same time, the bot should still be relatively skilled in answering questions in an accurate and nuanced manner.

Embodiments of the invention described herein address these and other problems, individually and collectively.

BRIEF SUMMARY

One embodiment of the invention is related to a method comprising receiving a text phrase from a user and parsing the text phrase using a natural language parser to generate distinct words. A vector of values relating to the distinct words is generated and compared to vectors in a graph database which relate to learned communities of language. Based on the comparing, a most similar community in the learned communities of language is determined and an action set associated with the most similar community is queried. A response to the text phrase from the user is then generated based on the action set. A response is then provided to the user.

Another embodiment of the invention includes a server computer comprising a processor, a memory device, and a computer-readable medium coupled to the processor. The computer-readable medium comprises code executable by the processor for implementing a method. In the method, the server computer can receive a text phrase from a user. The server computer can then parse the text phrase using a natural language parser to generate distinct words. After parsing the text phase, the server computer can generate a vector of values relating to the distinct words and then compare the vector of values to vectors in a graph database. The vectors in the graph database relate to learned communities of language. The server computer can then determine, based on the comparing, a most similar community in the learned communities of language. The server computer can query an action set associated with the most similar community and generate a response to the text phrase from the user based on the action set. The server computer can provide the response to the user.

Another embodiment of the invention includes a method comprising transmitting a text phrase to a server computer from a user device. The server computer can then determine a most similar community from a plurality of learned communities of language. The most similar community can correspond to the text phrase. The server computer can also query an action set associated with the most similar community and generate a response to the text phrase based on the action set. The user device can then receive the response from the server computer.

Another embodiment of the invention includes a user device comprising a processor, a memory device, and a computer-readable medium coupled to the processor. The computer-readable medium comprises code executable by the processor for implementing a method. The method includes transmitting a text phrase to a server computer. The server computer then determines a most similar community from a plurality of learned communities of language, wherein the most similar community corresponds to the text phrase. The server computer queries an action set associated with the most similar community and generates a response to the text phrase based on the action set. The method can further comprise receiving the response from the server computer.

Further details regarding embodiments of the invention can be found in the Detailed Description and the Figures described herein.

DETAILED DESCRIPTION

Figure 1:
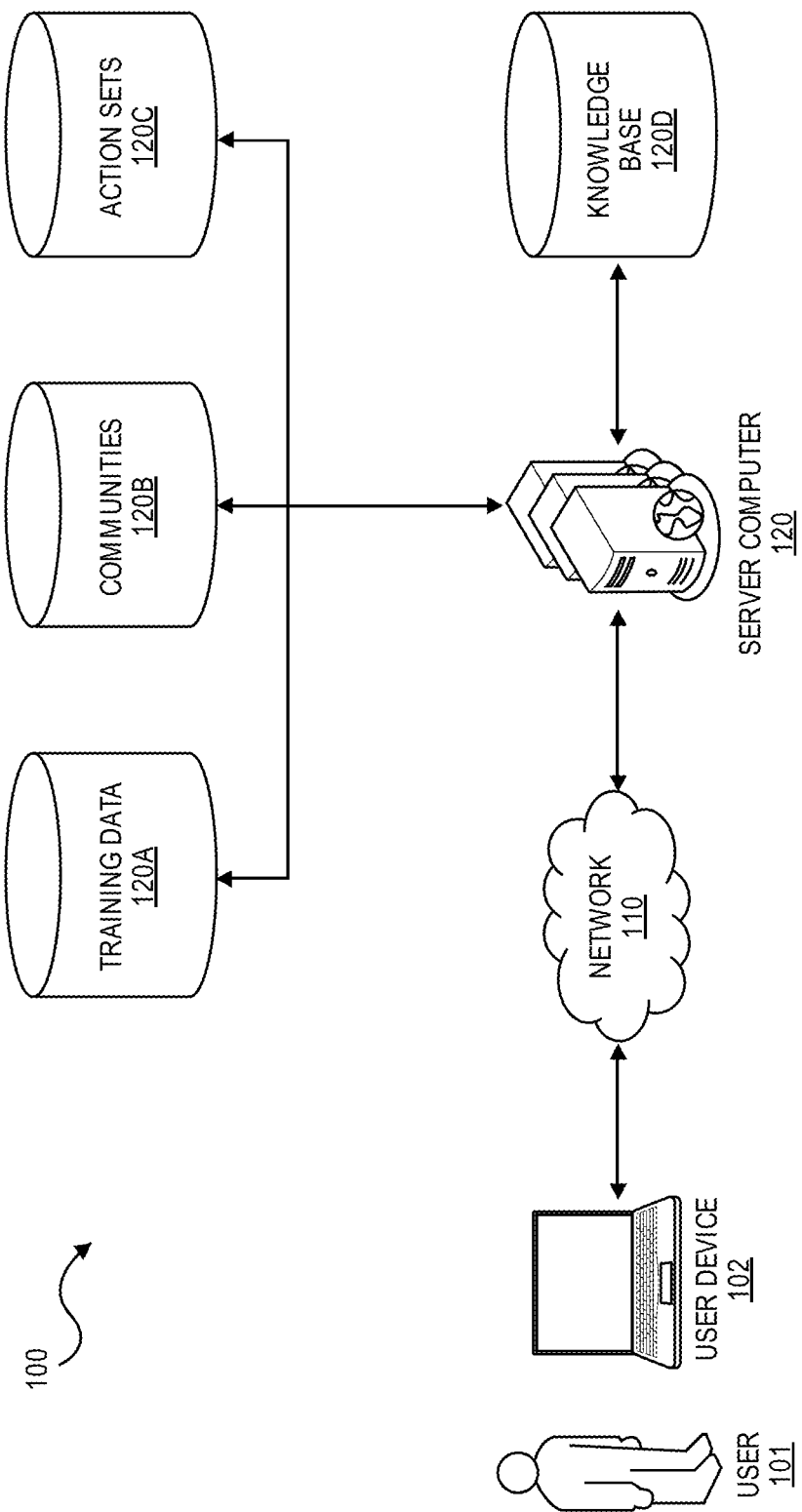
FIG. 1 shows a system for creating and using a chat bot to communicate with a user according to embodiments of the invention.

Before discussing detailed embodiments of the invention, some descriptions of certain terms may be useful.

A "user" may include an individual. In some embodiments, a user may be associated with one or more personal accounts and/or mobile devices. The user may also be referred to as a cardholder, account holder, or consumer in some embodiments.

A "user device" may include a device that is operated by a user. Examples of user devices may include a mobile phone, a smart phone, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, purses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G, or similar networks), Wi-Fi, Wi-Max, or any other communication medium that may provide access to a network such as the Internet or a private network.

A "topological graph" may include a representation of a graph in a plane of distinct vertices connected by edges. The distinct vertices in a topological graph may be referred to as "nodes." Each node may represent specific information for an event or may represent specific information for a profile of an entity or object. The nodes may be related to one another by a set of edges, E. An "edge" may be described as an unordered pair composed of two nodes as a subset of the graph G=(V, E), where is G is a graph comprising a set V of vertices (nodes) connected by a set of edges E. For example, a topological graph may represent a transaction network in which a node representing a transaction may be connected by edges to one or more nodes that are related to the transaction, such as nodes representing information of a device, a user, a transaction type, etc. An edge may be associated with a numerical value, referred to as a "weight," that may be assigned to the pairwise connection between the two nodes. The edge weight may be identified as a strength of connectivity between two nodes and/or may be related to a cost or distance, as it often represents a quantity that is required to move from one node to the next.

A "subgraph" or "sub-graph" may include a graph formed from a subset of elements of a larger graph. The elements may include vertices and connecting edges, and the subset may be a set of nodes and edges selected amongst the entire set of nodes and edges for the larger graph. For example, a plurality of subgraphs can be formed by randomly sampling graph data, wherein each of the random samples can be a subgraph. Each subgraph can overlap another subgraph formed from the same larger graph.

A "community" may include a group/collection of nodes in a graph that are densely connected within the group. A community may be a subgraph or a portion/derivative thereof and a subgraph may or may not be a community and/or comprise one or more communities. A community may be identified from a graph using a graph learning algorithm, such as a graph learning algorithm for mapping protein complexes. Communities identified using historical data can be used to classify new data for making predictions. For example, identifying communities can be used as part of a machine learning process, in which predictions about information elements can be made based on their relation to one another.

A "machine learning model" may include an application of artificial intelligence that provides systems with the ability to automatically learn and improve from experience without explicitly being programmed. A machine learning model may also be referred to as an "AI model" or a "predictive model." A machine learning model may include a set of software routines and parameters that can predict an output of a process (e.g., identification of an attacker of a computer network, authentication of a computer, a suitable recommendation based on a user search query, etc.) based on a "feature vector" and/or other input data. A structure of the software routines (e.g., number of subroutines and the relation between them) and/or the values of the parameters can be determined in a training process, which can use actual results of the process that is being modeled, e.g., the identification of different classes of input data. Examples of machine learning models include support vector machines (SVM), models that classify data by establishing a gap or boundary between inputs of different classifications, as well as neural networks, collections of artificial "neurons" that perform functions by activating in response to inputs.

A "data set" may include a collection of related sets of information composed of separate elements that can be manipulated as a unit by a computer. A data set may comprise known data, which may be seen as past data or "historical data." Data that is yet to be collected, may be referred to as future data or "unknown data." When future data is received at a later point it time and recorded, it can be referred to as "new known data" or "recently known" data, and can be combined with initial known data to form a larger history.

A "text phrase" can include data in the form of words and/or alphanumeric characters. A text phrase can be created by a user. The text phrase can include any suitable phrase. For example, the text phrase can be "where is a cafe," "how big is a cow," "what is my account balance," "list of best authors," and/or any other suitable text.

A "feature vector" or a "vector of values" may include a set of measurable properties (or "features") that represent some object or entity. A feature vector can include collections of data represented digitally in an array or vector structure. A feature vector can also include collections of data that can be represented as a mathematical vector, on which vector operations such as the scalar product can be performed. A feature vector can be determined or generated from input data. A feature vector can be used as the input to a machine learning model, such that the machine learning model produces some output or classification. The construction of a feature vector can be accomplished in a variety of ways, based on the nature of the input data. For example, for a machine learning classifier that classifies words as correctly spelled or incorrectly spelled, a feature vector corresponding to a word such as "LOVE" could be represented as the vector (12, 15, 22, 5), corresponding to the alphabetical index of each letter in the input data word. For a more complex "input," such as a human entity, an exemplary feature vector could include features such as the human's age, height, weight, a numerical representation of relative happiness, etc. Feature vectors can be represented and stored electronically in a feature store. Further, a feature vector can be normalized, i.e., be made to have unit magnitude. As an example, the feature vector (12, 15, 22, 5) corresponding to "LOVE" could be normalized to approximately (0.40, 0.51, 0.74, 0.17).

"Unsupervised learning" may include a type of learning algorithm used to classify information in a dataset by labeling inputs and/or groups of inputs. One method of unsupervised learning can be cluster analysis, which can be used to find hidden patterns or grouping in data. The clusters may be modeled using a measure of similarity, which can defined using one or metrics, such as Euclidean distance.

A model can be trained using training data through machine learning such that the model may be used to make accurate predictions. The prediction can be, for example, a classification of an image (e.g., identifying images of cats on the Internet) or as another example, a recommendation and/or a response (e.g., a movie that a user may like or a restaurant that a consumer might enjoy). Training data may be collected as existing records. The existing records can be any data from which patterns can be determined from. These patterns may then be applied to new data at a later point in time to make a prediction. The existing records may be, for example, user data collected over a network. For example, the existing records can include conversation data. Using the existing records as training data, training may be performed through a learning module. The learning module may comprise a learning algorithm, which may be used to build the model.

The model may be a statistical model, which can be used to predict unknown information from known information. Once the model has been built from the learning module, the model may be used to generate a predicted output (i.e., a response) from a new request (i.e., received text phrase). The new request may be a question from a user. The model can determine an appropriate response. For example, the new request may be a request for classifying an image or for a recommendation for a user.

An "action set" can include a set of actions. An action set can include any suitable number of actions, for example, 1, 2, 5, 10, etc. An action set can correspond to a community. Different communities in a graph can correspond to different action sets.

An "action" can include a manner, style, or process of doing something. In some embodiments, a likelihood score and a type can be assigned to each action (i.e., a priority and/or conditional statement that can additionally direct the decisions of the server computer). The likelihood score may reflect the likelihood of a specifically defined state as being true (e.g., a risk score reflecting the likelihood of fraud). The type may be an instruction or conditional statement for when an action in the action set should be performed (e.g., "required [do always]," "conditional [if x do y else z]," "optional [do sometimes]").

A "lexeme" can include a basic lexical unit of a language. A lexeme can consist of one word or several words considered as a unit, which can be applied to a family of words related by form or meaning. For example, the lexeme "run" can include as members "run" (lemma), "running" (inflected form), and "ran."

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "processor" may include a device that processes something. In some embodiments, a process can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

Details of some embodiments of the present invention will now be described. As previously explained, some embodiments are related to generating automated responses to users in an auditable and effective manner. In embodiments, a chat bot can be created from a machine learning model. The machine learning model may be a graph learning model, in which distinct words relating to specific types of questions or conversations can be grouped as communities. Each community can be associated with a set of actions, from which an appropriate response to a user inquiry can be generated.

FIG. 1 shows a system for creating and using a chat bot to communicate with a user. System 100 comprises a user 101 operating a user device 102. The user device 102 can be used by the user 101 to access a network 110. For example, the user 101 may use their laptop (i.e., the user device 102) to connect to the internet over Wi-Fi™. The user device 102 may comprise one or more input elements to allow the user 101 to generate data (e.g., a text phrase). For example, the user device 102 may comprise a keyboard, a mouse, a touchscreen, a camera, a microphone, etc.

Through the network 110, the user 101 is able to contact a service provider. For example, the service provider can be a payments provider, financial institution, knowledge provider, etc. Communications between the user 101 and the service provider may be handled though one or more server computers, which can be programmed to respond to various messages received over the network 110. For example, a server computer 120 can be used to host a website through which user selections and inputted text can be received and processed.

Messages between the entities, providers, networks, and devices illustrated in FIG. 1 may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like. The network 110 may include any suitable communication medium. The network 110 may be one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

In embodiments, the server computer 120 may be used to build, train, and utilize a machine learning model for generating automated responses to users. Training data 120A, in conjunction with a learning algorithm, may be used to identify patterns for making predictions by the model. Training data 120A may include texts from recorded conversations and/or may include data from a lexical database (e.g., WordNet) which may contain data relating to a particular language (e.g., English, French, etc.).

The server computer 120 may further have access to a graph database of communities 120B, which the server computer 120 may create from training data 120A. For example, a graph learning algorithm can be used to group words contained in training data 120A into distinct communities of language. The communities 120B may each be associated with a list of actions in action sets 120C. For example, a language community relating to the user 101 trying to understand a topic or thing at a basic level may be associated with an action to deliver a definition or encyclopedia excerpt to the user 101 regarding the topic (e.g., "Q: What is a squirrel?; A: A squirrel is a small rodent that . . . "). As another example, a language community relating to the user 101 inquiring about the value of something may be associated with an action to query a database for the value in question (e.g., "Q: What is my account balance?; A: Your account balance is $500" or "What is the population of Alabama?; A: The population of Alabama is 4.863 million.").

In embodiments, data that can be queried and presented in a response by the server computer 120 may be stored in a knowledge base 120D and/or some other database of information such as an account database, database of financial information, fact database, etc. The server computer 120 can query the knowledge base 120D for any suitable information prior to transmitting the response to the user device 102.

The databases described herein can include conventional, fault tolerant, relational, scalable, secure databases such as those commercially available from Oracle™ or Sybase™.

Figure 2:
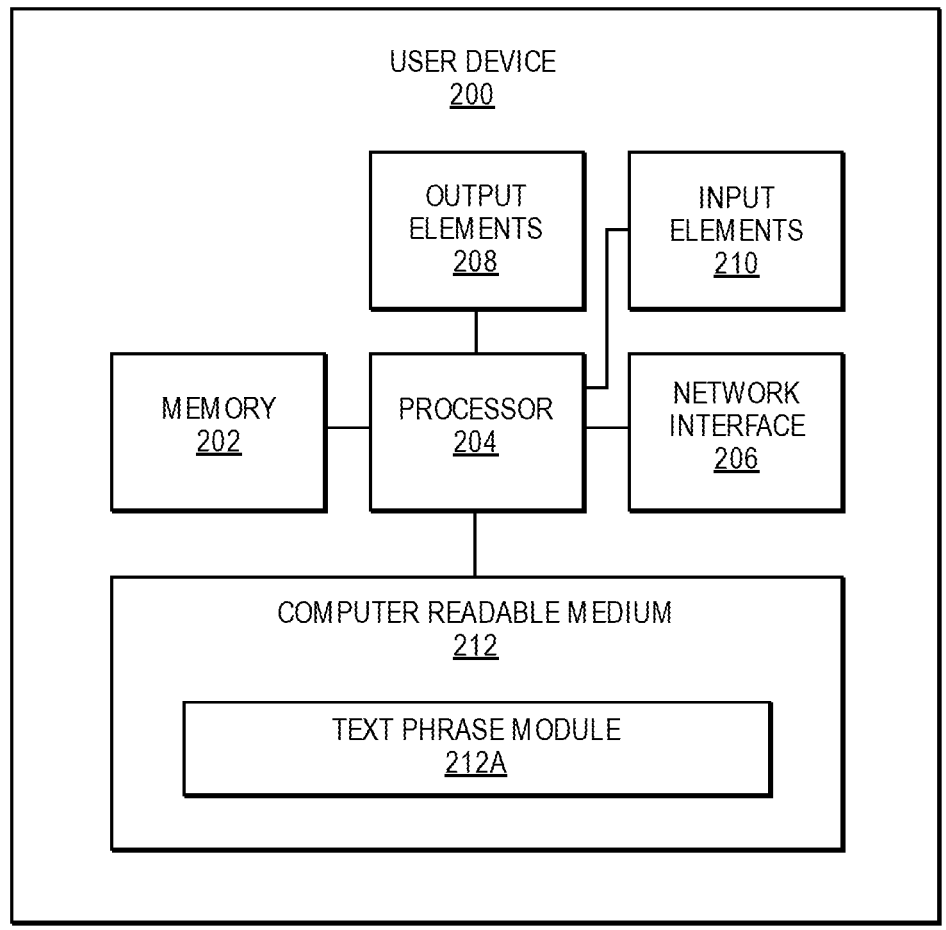
FIG. 2 shows a block diagram illustrating a user device according to embodiments of the invention.

FIG. 2 shows a block diagram of a user device 200 according to some embodiments of the invention. The exemplary user device 200 may comprise a processor 204. The processor 204 may be coupled to a memory 202, a network interface 206, output elements 208, input elements 210, and a computer readable medium 212 comprising a text phrase module 212A.

The memory 202 may be used to store data and code. The memory 202 may be coupled to the processor 204 internally or externally (e.g., cloud based data storage), and may comprise any combination of volatile and/or non-volatile memory, such as RAM, DRAM, ROM, flash, or any other suitable memory device.

The network interface 206 may include an interface that can allow the user device 200 to communicate with external computers. The network interface 206 may enable the user device 200 to communicate data to and from another device (e.g., resource provider computer, authorization computer, etc.). Some examples of the network interface 206 may include a modem, a physical network interface (such as an Ethernet card or other Network Interface Card (NIC)), a virtual network interface, a communications port, a Personal Computer Memory Card International Association (PCM-CIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The one or more output elements 208 may comprise any suitable device(s) that may output data. Examples of output elements 208 may include display screens, speakers, and data transmission devices.

The one or more input elements 210 may include any suitable device(s) capable of inputting data into the user device 200. Examples of input devices include buttons, touchscreens, touch pads, microphones, etc. For example, the input elements 210 can include a touchscreen with an on screen keyboard via which a user can input a text phrase.

The computer readable medium 212 may comprise code, executable by the processor 204, to implement a method comprising: transmitting, by a user device, a text phrase to a server computer, wherein the server computer determines a most similar community from a plurality of learned communities of language, wherein the most similar community corresponds to the text phrase, and wherein the server computer queries an action set associated with the most similar community and generates a response to the text phrase based on the action set; and receiving, by the user device, the response from the server computer.

The text phrase module 212A, in conjunction with the processor 204, can be configured to receive text phrase(s) from a user. The text phrase module 212A can also include past text phrase(s). In some embodiments, the text phrase module 212A can be a message stream including text phrases created by the user as well as responses received from a server computer. In some embodiments, the user can select to transmit the text phrase to the server computer using an element, such as a button, of the text phrase module 212A.

Figure 3:
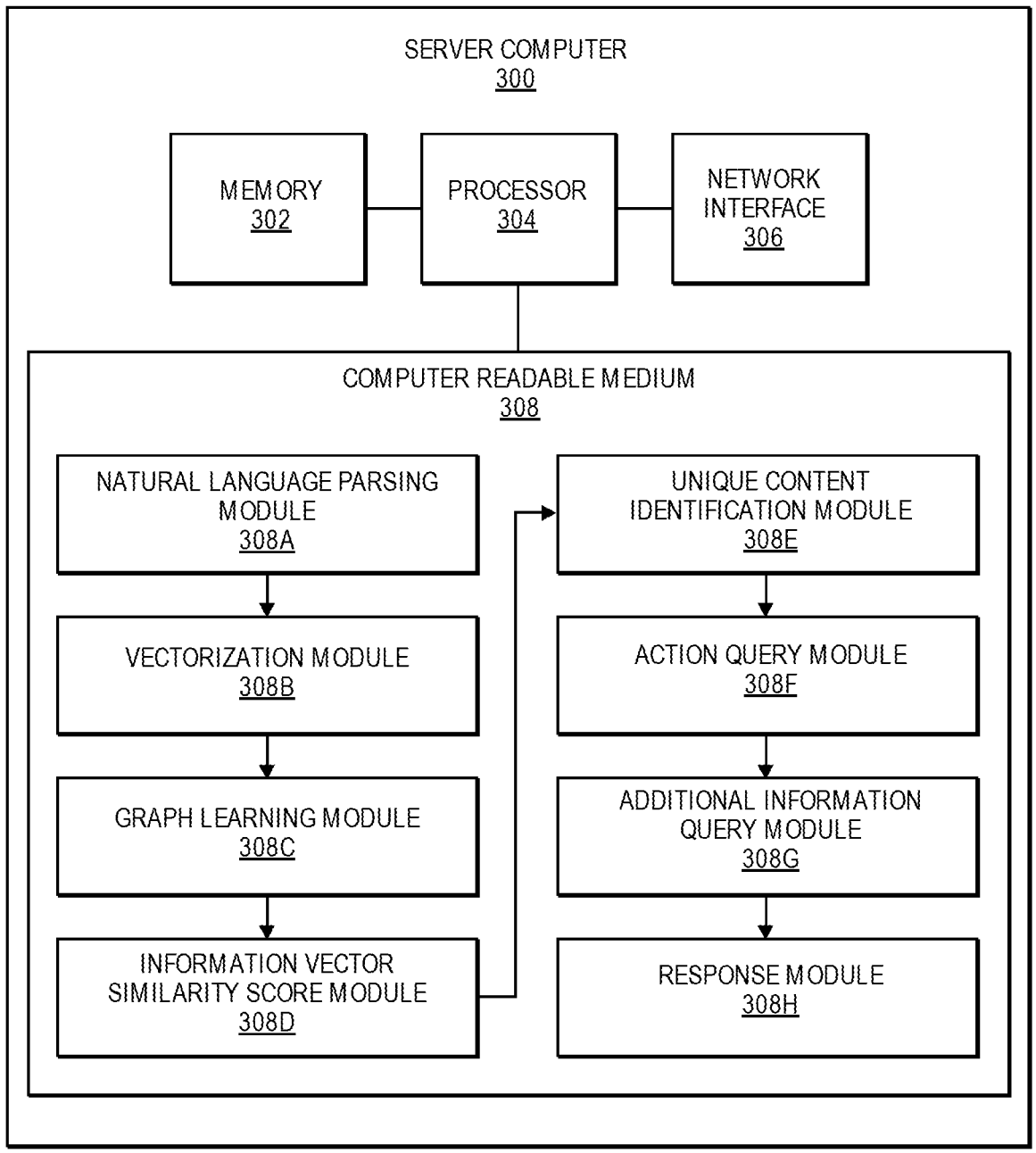
FIG. 3 shows a block diagram illustrating a server computer according to embodiments of the invention.

FIG. 3 shows a block diagram of a server computer 300 according to some embodiments of the invention. The exemplary server computer 300 may comprise a processor 304. The processor 304 may be coupled to a memory 302, a network interface 306, and a computer readable medium 308 comprising a natural language parsing module 308A, a vectorization module 308B, a graph learning module 308C, an information vector similarity score module 308D, a unique content identification module 308E, an action query module 308F, an additional information query module 308G, and a response module 308H.

The memory 302 can be similar to the memory 202, described above, and will not be repeated here. The network interface 306 can be similar to the network interface 206, described above, and will not be repeated here.

The computer readable medium 308 may comprise code, executable by the processor 304, to implement a method comprising: receiving a text phrase from a user; parsing the text phrase using a natural language parser to generate distinct words; generating a vector of values relating to the distinct words; comparing the vector of values to vectors in a graph database, the vectors in the graph database relating to learned communities of language; determining, based on the comparing, a most similar community in the learned communities of language; querying an action set associated with the most similar community; generating a response to the text phrase from the user based on the action set; and providing the response to the user.

The natural language parsing module 308A, in conjunction with the processor 304, can parse sentences into distinct words having unique meanings. For example, the natural language parsing module 308A can include a Stanford Natural Language Parser. As an example, the server computer can parse a text phrase of "how big is a cow," to the distinct words of "how," "big," "is," "a," and "cow." In some embodiments, the natural language parsing module 308A can parse conversations retrieved from a conversation database. In other embodiments, the natural language parsing module 308A can parse text phrases received from a user via a user device.

The vectorization module 308B, in conjunction with the processor 304, can generate a vector of values relating to the distinct words determined by the natural language parsing module 308A. The vectorization module 308B can generate the vector of values by converting each distinct word to an assigned identifier. Each word can be assigned to a unique identifier. For example, the word "how" can be assigned to the identifier "888," whereas the word "big" can be assigned to the identifier "981." Each word and assigned identifier can be stored by the server computer 300, for example, in a conversion table and/or database. The vectorization module 308B can utilize the conversion table to covert each word to the assigned identifier to generate the vector of values. For example, the distinct words "how," "big," "is," "a," and "cow" can be vectorized as [888, 981, 007, 199, 733].

A plurality of vectors from language data can be generated and can further be used to generate a graph. The graph learning module 308C can learn patterns and group words typically used in the same context together. These patterns or groups of words can be referred to as "communities." Each node (i.e., word) in the graph can also be assigned a type (e.g., noun, verb, adverb, etc.). The node types can be used as a parameter in learning for adjusting edge weights to generate a desired result, as described herein. The graph learning module 308C can include any suitable graph learning algorithm. For example, the graph learning algorithm may be an unsupervised learning algorithm for generating overlapping communities for a network.

The information vector similarity score module 308D, in conjunction with the processor 304, can determine a similarity score between a vector of values of the text phrase received from the user to the plurality of vectors of the graph. The information vector similarity score module 308D can determine a community that is most similar or most relevant to the received text phrase. In some embodiments, the similarity score can be a value from 0 to 100. In other embodiments, the similarity score can be a difference in the vector of values of the text phrase and a vector representative of the community (e.g., an average vector of the community).

The unique content identification module 308E, in conjunction with the processor 304, can identify unique content. For example, the unique content identification module 308E can identify unique content (e.g., a unique word) in the received text phrase. In some embodiments, the unique content can be identified in comparison with planned executions of a behavior tree, as described herein in further detail. As an example, for the text phrase of "how big is a cow," the unique content identification module 308E can determine that the text phrase is most similar in scope and context to a question stored in a conversation database of "how big is a turkey." The unique content identification module 308E can identify that both questions can be responded to with "a [unique content] is [size]." Further, the unique content identification module 308E can flag the word "cow" as unique content, as compared to the stored question which relates to the unique content of "turkey."

The action query module 308F, in conjunction with the processor 304, can query community action sets for actions. The action query module 308F can query an action set associated with the most similar community as determined by the information vector similarity score module 308D and/or the unique content identification module 308E. For example, the action query module 308F can query a community action set database for an action set associated with the most similar community to the vector of values of the text phrase, determined by the vectorization module 308B. The most similar community, in this case, can be community 1258. The action query module 308F can query the database for the action set of community 1258. In some embodiments, the action query module 308F can query the database for more than one action set associated with, for example, the two most similar communities.

The additional information query module 308G, in conjunction with the processor 304, can query for additional information. In some embodiments, the query for additional information can be performed as part of an action of the action set of the most similar community. The additional information can be queried from an appropriate database. The additional information query module 308G can query account data from an account data database and/or query any other suitable information from a knowledge base. For example, the action set of the most similar community can include an action of "determine the size of a cow." The additional information query module 308G can query a knowledge base for the size of a cow. In this case, the knowledge base can be a zoological database. In other embodiments, the knowledge base can be any suitable database comprising any suitable information, for example, data about a particular topic pulled from various parts of the internet aggregated by Freebase, Google Knowledge Graph, and/or other similar source.

The response module 308H, in conjunction with the processor 304 an respond to the user. The response module 308H can generate and transmit a response to the user device. For example, the response to the text phrase "how big is a cow" can be "a typical cow is about 5 foot tall and about 8 feet wide." The server computer 300 can transmit the response to the user device over any suitable communication channel described herein.

Figure 4:
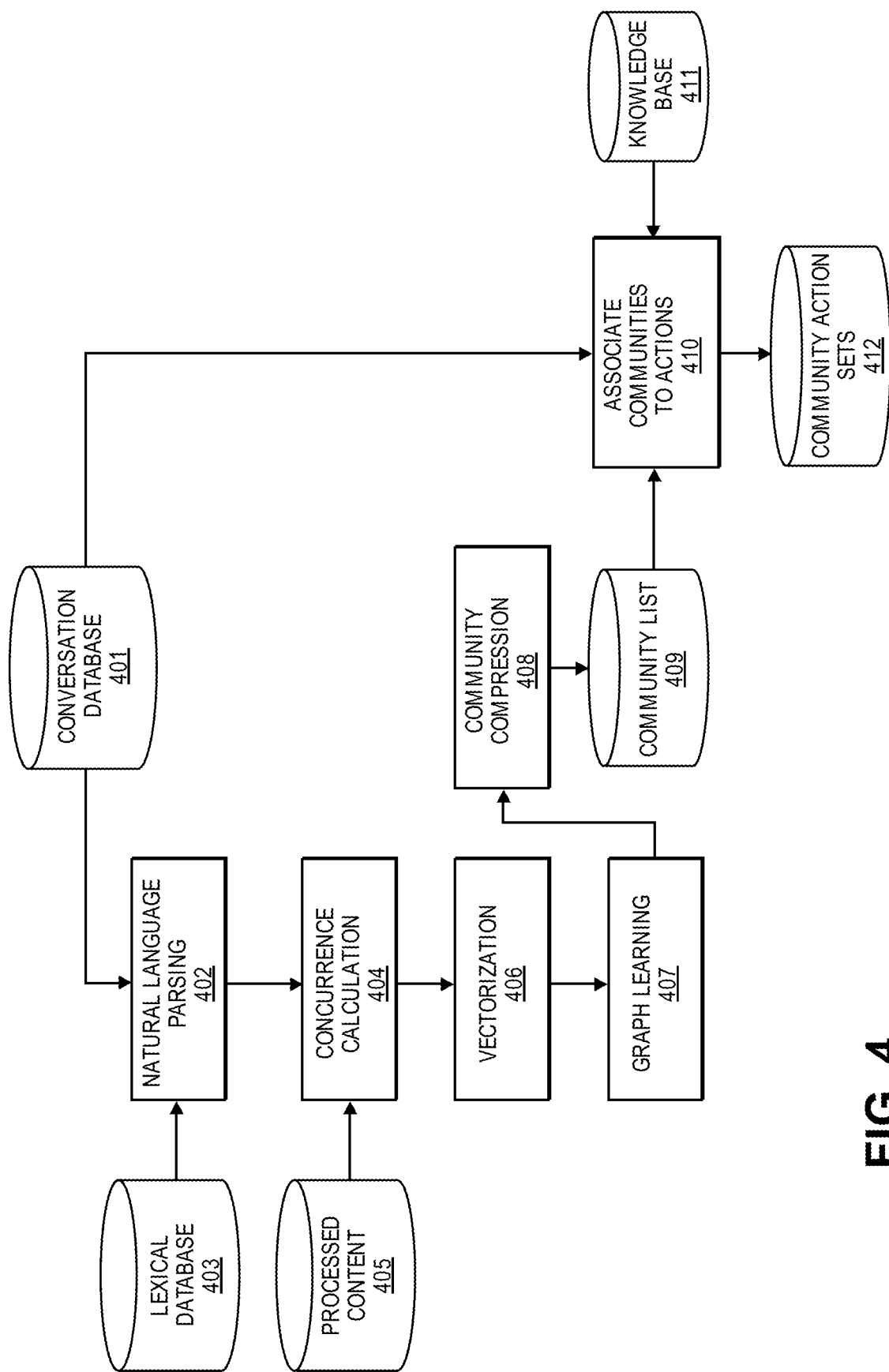
FIG. 4 shows a dataflow diagram for building a chat bot using natural language processing and graph learning according to embodiments of the invention.

FIG. 4 shows a dataflow diagram for building a chat bot using natural language processing and graph learning. The method illustrated in FIG. 4 will be described in the context of building and/or training a chat bot. It is understood, however, that the invention can be applied to other circumstances. Although the steps are illustrated in a specific order, it is understood that embodiments of the invention may include methods that have the steps in different orders. In addition, steps may be omitted or added and may still be within embodiments of the invention. The data blocks shown in FIG. 4 may include data processed by the server computer 120 of FIG. 1 for creating a chat bot.

In embodiments, text data from a conversation database 401 and a lexical database 403 can be processed using natural language parsing 402. The conversation database 401 can include previous conversations. Each conversation may include a question (i.e., text phrase), a response, and an action. For example, a conversation can include the question "what is the population of California." The corresponding action can be to retrieve the population of California from a database (e.g., from a knowledge base 411). The response can be "the population of California is 39.5 million." In some embodiments, conversations may be in the form of a template. For example, a question may be "what is the population of [area]," the action can be to retrieve the population of the [area], and the response can be "the population of [area] is [population_data]."

The lexical database 403 can include a database that is an organized description of the lexemes of a language. The lexical database 403 can include data that may approximate the lexicon of a native speaker. The lexical database 403 can include an inventory of known morphemes and information about their meanings. For each sense of a morpheme, it may include such things as a part of speech designation, a definition, sample sentences to illustrate this sense, cultural annotations to indicate its significance, and/or identification of semantic relationships with other morphemes. Other information stored in the lexical database 403 may include lexical categories, synonyms, and/or semantic and phonological relations between different words and/or sets of words.

Natural language parsing 402 can be used to tag words and parse sentences into distinct words having unique meanings. For example, natural language parsing 402 can include the Stanford Natural Language Parser. For example, the server computer can parse a text phrase of "what is the population of California," to the distinct words of "what," "is," "the," "population," "of," and "California." The server computer can parse any suitable number of conversations retrieved from the conversation database 401.

Parsed phrases can then be used to perform concurrence calculation 404, in which the occurrence of two words occurring together in a sentence or question/answer sequence can be tallied. This may be performed in conjunction with processed content 405 for more accurate results. For example, processed content 405 may comprise data for lemmatizing common word forms such that derivatives of different words can be addressed as equivalents (e.g., "is, are, am, be" or "car, cars, car's," etc.). Processed content 405 can be stored in a processed content database. The processed content 405 may be determined prior to being used during the concurrence calculation 404.

For example, during the concurrence calculation 404 in, for example, an evaluation of a conversation, the server computer can determine the number of occurrences of the verb "to walk" which may appear as "walk," "walked," walks," and/or "walking." The processed content 405 can be utilized to determine the lemma of a word and/or phrase.

Upon calculating the concurrence of words together, vectorization 406 may be performed in which words can be assigned unique identifiers (e.g., "you=ID: 1252," "are =ID: 1242," etc.) and their concurrence together in a sentence can be expressed as a vector (e.g., Vector [You are here]={1252, 1242, 1253}). A plurality of vectors from a plurality of language data can be generated and can further be used to generate a graph. For example, a weighted directed graph can be generated, with individual words expressed as nodes and their existence together in common sentences expressed as edges. In this example, the weight of the edges can be a normalized concurrence value calculated, for example, in concurrence calculation 404. In some embodiments, the server computer can vectorize the text phrases as well as the responses of each conversation retrieved from the conversation database 401.

From the generated graph, graph learning 407 can be performed to learn patterns and group words typically used in the same context together. These patterns or groups of words can be referred to as "communities." Each node (i.e., word) in the graph can also be assigned a type (e.g., noun, verb, adverb, etc.). The node types can be used as a parameter in learning for adjusting edge weights to generate a desired result. For example, node types can be used to assign rules such as "reduce weights for edges connected to pronouns by 10%" so as to have an even spread of pronouns in each community generated.

Graph learning 407 can include any suitable graph learning algorithm. For example, the graph learning algorithm may be an unsupervised learning algorithm for generating overlapping communities for a network. According to embodiments, the network can be represented as an undirected simple graph G(V, E) with unique information elements of interaction data as nodes (i.e., vertices), V, and interactions between nodes as edges, E. Each edge may have a given length and/or weight, which may quantify the state of interaction between the connected nodes. In some embodiments, nodes that frequently interact with one another, and/or have a high probability of interacting with one another, may be separated by short distances and may be densely populated within a given region of the graph, G. For example, the word "cafe" may frequently occur near the word "where," and the length of the edge between the node representing "cafe" and the node representing "where" can be equal to 5. Meanwhile, the word "cow" may not occur frequently with the word "desk," and the length of the edge between the node representing "cow" and the node representing "desk" can be 10. In this example, "5" may indicate a stronger association between two words exemplified by a shorter edge, while "10" may indicate a weaker association between two words exemplified by a longer edge. The graph learning algorithm can be further described in PCT Application WO 2018/013566 A1 filed Jul. 11, 2017, which is herein incorporated in its entirety for all purposes.

Upon initiating graph learning 407, a list of communities may be generated as an output. For example, identifiers for words that should be grouped together according to their typical use and context may be identified together as a unique set. As an example, a community may comprise "ID: 12125152—chair, 1291224—table, 12512—desk" as well as "ID: 153235—wood, 12512—leather, 1208—metal" and "15350—on, 13332—under, 2038523—in." This may be due to the typical occurrence of these words being included in such sentences as, "it is on the wooden chair" or "it is under the metal desk."

In some embodiments, the communities learned through graph learning 407 can undergo community compression 408, in which communities containing nearly the same information can be combined or merged together as a single community. The communities may then be aggregated into a list or graph database such as community list 409. For example, two communities may overlap by a certain amount; the server computer can compress the two communities into one community if the two communities overlap by a threshold amount. For example, if two communities share 80% of their nodes (i.e., words), then the server computer can determine to combine the two communities. The threshold amount of overlap can be any suitable value, such as, for example, 50%, 60%, 75%, 90%, etc.

After the server computer determines the communities, the server computer can store the communities in a community list 409 in a database. The community list 409 can be stored in any suitable community list database. Communities from the community list 409 can then be associated to actions 410. The communities can be associated to actions by using information from the conversation database 401 and a knowledge base 411. The knowledge base 411 can include any suitable database and can include any suitable knowledge (i.e., data, facts, etc.) related to the conversations in the conversation database 401 and/or the communities in the community list 409. In some embodiments, the knowledge base 411 can include data related to questions expected to be received by the server computer. In some embodiments, the server computer may be in operative communication with more than one knowledge base 411.

For example, a community containing words associated with a question about what something is can be linked to an action to retrieve a definition stored in the knowledge base 411. A series of appropriate actions can be assigned to a given community, and can be compiled into a set. In some embodiments, actions in an action set can be ranked according to priority or can be assigned conditional statements relating to their relevance. Examples of conditional statements can include, "if there is a 99% match, then generate a response according to #1 ranked action" as well as "if a risk score is above 90, then generate a response according to #4 ranked action" among others. A plurality of action sets can be generated for a plurality of communities in the community list 409, and can be stored in a database of community action sets 412. The action sets in the community action sets 412 can later be retrieved during a conversation with a user, as described herein, and can be used to generate responses to the user's inquiries. In some embodiments, the community action sets 412 can be stored in any suitable database.

Figure 5:
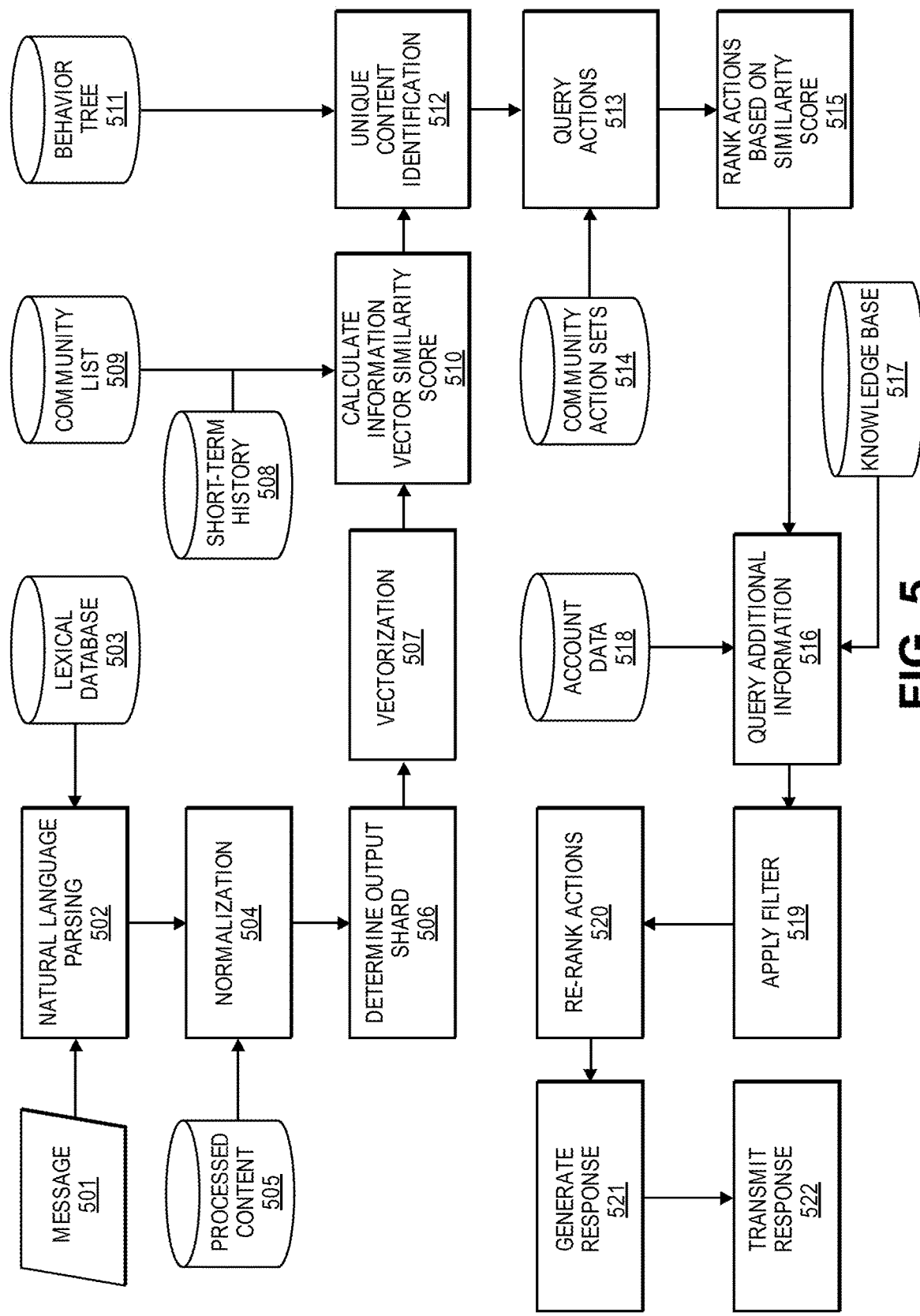
FIG. 5 shows a dataflow diagram for generating automated responses to a user's message based on learned communities and associated actions according to embodiments of the invention.

FIG. 5 shows a dataflow diagram for a server computer generating automated responses to a user message based on learned communities and associated action sets. The data blocks shown in FIG. 5 can include data processed by server computer 120 when communicating with user 101 in an automated fashion. During a conversation between a user operating a user device and a server computer including a chat bot contacted over a network, the user device can transmit a message to the server computer. The message may contain a text phrase inputted by the user the user device. The server computer may be running a machine learning model capable of determining a response to the message. It is understood, however, that the invention can be applied to other circumstances. Although the steps are illustrated in a specific order, it is understood that embodiments of the invention may include methods that have the steps in different orders. In addition, steps may be omitted or added and may still be within embodiments of the invention.

The user can input a text phrase into the user device which can transmit a message 501 comprising the text phrase to the server computer. The user device can transmit the message 501 using any suitable communication channel, as described herein. For example, the user can ask the server computer what the balance of their account is by inputting a text phrase of "what is my account balance?" The server computer can receive the message 501 from the user device.

After receiving the message 501 from the user, the message 501 may undergo natural language parsing 502 which can be performed according to information retrieved from a lexical database 503. The lexical database 503 can be similar to the lexical database 403, and natural language parsing 502 can be similar to natural language parsing 402. The server computer can parse the text phrase using a natural language parser to generate distinct words. For example, the text phrase from the user containing the text, "what is my account balance?" may be parsed into the words, "what," "is," "my," "account," and "balance."

Next, the server computer can normalize the parsed text. Normalization 504 of the parsed text can be performed using processed content 505. The processed content 505 can be similar to the processed content 405. For example, the processed content 505 may contain data for lemmatizing different derivations of a word into a base word having a distinctly unique meaning. As an example, the parsed text of "greatest," "novel," "written," "this," and "year" can be lemmatized to "good," "book," "write," "this," and "year." In some embodiments, normalization 504 can include inclusive lemmatization. For example, a subgroup of the population may input a word in a different way than another subgroup of the population, while both subgroups intent is the same. Normalization 504 may take these cultural differences within a language into account. For example, the processed content 505 can include lemmas which reflect inclusive lemmatization.

After normalizing the parsed text, the server computer can determine an output shard 506. An output shard can be a server computer that is related to content of the text phrase(s) and/or response(s). For example, a first server computer can be a shard relating to accounts, balances, transactions, and/or the like, whereas a second server computer can be a shard relating to definition queries such as the user asking what the definition of a word is. In some embodiments, the server computer can determine the output shard based on the normalized text. In other embodiments, the server computer can apply one or more rules to determine the output shard. For example, the normalized text can include the word "account." The server computer can apply a rule which may indicate to route the normalized text containing the keyword "account" to an account related server computer, such as the first server computer.

After determining the output shard, the server computer can route the normalized text to the determined output shared (i.e., server computer). The normalized text can be routed using any suitable communication channel described herein. In other embodiments, the server computer can determine not to route the normalized text to a different server computer.

The server computer can then generate a vector of values relating to the distinct words. The normalized words can be replaced by unique values or identifiers representing each word and placed into a vector during vectorization 507. For example, "what," "is," "my," "account," "balance" can be vectorized as [123, 345, 34, 5677, 456]. Each word can correspond to a predetermined identifier. In some embodiments, the server computer can perform vectorization 507 utilizing a conversion table from words to identifiers.

After performing vectorization 507, the server computer can calculate an information vector similarity score 510. The vector created through vectorization 507 can be compared, by the server computer, to communities in a community list 509 to calculate the information vector similarity score for determining a community that is most similar or most relevant to the message 501 received. For example, in some embodiments, the most similar community can be considered as the most similar when the most similar community corresponds to a vector of values most mathematically similar to the vector of values of the text phrase. In some embodiments, the similarity score can be a value from 0 to 100. In other embodiments, the similarity score can be a difference in the vector of values of the text phrase and a vector representative of the community (e.g., an average vector of the community). The most similar or most relevant community can additionally be selected based on previous messages submitted during the present conversation with the user, which may include questions and answers logged in short-term history 508. For example, from evaluating previous responses by the user, the chat bot may as a result continuing following a specific path or line of questioning or may avoid repeating the same question that has not moved the conversation forward.

The short-term history 508 can be stored in any suitable database. The short-term history 508 can include short-term history for each user device in communication with the server computer. For example, the server computer can be in communication with ten different users. Short-term history corresponding to each different user can be stored in the short-term history 508 database. In some embodiments, an entry in the short-term history 508 database can be removed, deleted, and/or archived in any suitable manner after a predetermined amount of time, such as, 2 hours, 12 hours, 1 day, 1 week, etc.

For example, the short-term history 508 can include three recent text phrases and responses for a particular user. The previous three text phrases may have been determined to have vectors of values most similar to a geography community. The user may have asked questions such as "what is the capital of Germany," "how many oceans are there," and "are there mountain ranges in Canada." The server computer can determine that a new text phrase received from the user may be most similar to the geography community. The server computer can compare the vector of values of the new text phrase to a vector representative of the geography community prior to comparing the vector of values to other communities, such as a car maintenance community, due to the conversation stored in the short-term history 508.

After calculating the vector similarity score, the server computer can perform unique content identification 512. Unique content can be identified in comparison with planned executions of a behavior tree 511. The behavior tree 511 can be stored in a behavior tree database. In some embodiments, the behavior tree 511 can include heuristic controls. For example, the heuristic controls can include rules such as "skip the word 'cute'" as the inclusion of the word "cute" may not change the meaning of the text phrase. For example, the user can ask "how big is a cute squirrel?" However, this question can be similar to the question "how big is a squirrel?" The heuristic controls can include any suitable controls and/or rules regarding unique content identification. In other embodiments, the behavior tree 511 can include certified responses. For example, a certified response can be to respond to the question "how big is a squirrel" with the response "a squirrel can range from 9.1 to 12 inches in length." In this case, the server computer can determine that the question of the text phrase received from the user matches a question associated with a certified response. The server computer can determine to respond with the certified response.

As another example, per the comparison of the vector to the community list, a question regarding "what is a squirrel?" may be determined to be most similar in scope and context to the question "what is a prism?" in that both questions should be responded to with a template of "a [unique content] is a [definition]." The word squirrel can then be flagged as the unique content, where the word "prism" has before occupied. As such, although the word squirrel may not have been used in a previous conversation, it can be identified as unique and can be responded to based on typical question-answer behavior.

After unique content identification 512, the server computer can query actions 513 from community action sets 514. The server computer can query an action set associated with the most similar community. For example, a lookup may be executed, which may return the two most similar communities to the input vector as well as their associated similarity scores relative to the input vector. For instance, it may be characterized by the following in an example: lookup([123, 345, 34, 5677, 4566])=[(community—2232, score—0.99)], [community—567, score—0.455], where "lookup" is a lookup function, and 0.99 and 0.455 are similarity scores associated with communicates 2232 and 567, respectively. In one embodiment, the most similar community to the input vector may be chosen for determining the action set (e.g., choose community—2232= query_action_set(2232)).

The community action sets 514 can include any suitable number of community action sets. Each community in the community list 509 can correspond to an action set in the community action sets 514. Each action set can comprise one or more action(s). The one or more actions in the action set can include actions such as query for unique content, query account data, perform a risk analysis, retrieve data from a knowledge base, respond to the user, recommend an item, data, information, etc., and/or any suitable action related to the content of the text phrase.

In some embodiments, after querying the action set, the server computer can rank actions based on the similarity score 515. The actions can also be ranked based on a likelihood score and a type assigned to each action (i.e., a priority and/or conditional statement that can additionally direct the decisions of the server computer). The likelihood score may reflect the likelihood of a specifically defined state as being true (e.g., a risk score reflecting the likelihood of fraud). The type may be an instruction or conditional statement for when an action in the action set should be performed (e.g., "required [do always]," "conditional [if x do y else z]," "optional [do sometimes]"). For example, the action set for community 2232 can be returned as: 1) run account risk score (0.99, required); 2) determine if risk level meets cutoff (0.98, required); 3) query account information (0.78, conditional); and 4) replay your account balance is $s (0.67, optional).

As another example, the text phrase may be "where is a cafe?" The most similar community can correspond to the action set comprising the actions of 1) "determine location," 2) "determine if location is open," and 3) "determine alternate locations." The first action of "determine location" can have a type of "required." The second action of "determine if location is open" can have a type of conditional (e.g., if a location is found, then determine the operating hours of the location). The third action of determine alternate locations have a type of "optional." As a result of the actions in the action set, the sever computer can determine a location of a cafe near to the user. The server computer can then determine if the selected cafe is open. If the server computer determines that the cafe is not currently open, then the server computer can optionally determine an alternate cafe. The server computer can, for example, respond with "cafe ABC is at location X, it closes in 2.5 hours."

After ranking the actions, the server computer can query for additional information 516. In some embodiments, the query for additional information 516 can be queried as part of an action. The additional information can be queried from an appropriate database. For example, the server computer can query account data 518 from an account data database and/or query information from a knowledge base 517. The account data 518 can include any suitable data regarding an account. For example, the account data 518 can include amount(s), account identifier(s), history data, date(s), expiry date(s), name(s), terms and conditions, and the like. The knowledge base 517 can include any suitable knowledge which may relate to the text phrase. The knowledge base 517 can include facts, data, definitions, results, etc. For example, the knowledge base 517 can include information regarding animals such as squirrels. In some embodiments, the knowledge base 517 can comprise a plurality of databases that can store different datasets. For example, one database can include a dictionary comprising definitions, whereas another database can include data regarding books written from 1950 to 2015.

For example, user account data 518 may be obtained in order to respond with the user's account balance (e.g., "your account balance is $500"), while additional information in knowledge base 517 can be obtained to determine information about unique content (e.g., data about a particular topic pulled from various parts of the internet aggregated by Freebase, Google Knowledge Graph, or other similar source).

The server computer can then apply a filter 519. The filter 519 may include additional conditions that can be completed in order to perform an action. In some embodiments, a filter can include a check to determine whether or not the user is authenticated in order to receive the response. For example, the user may need to be authenticated to access the account data. If the server computer determines that the user has been authenticated then the server computer can proceed to generate a response 521. However, if the server computer determines that the user has not been authenticated, then the server computer can re-rank the actions 520. For example, the server computer can re-rank the actions such that the highest ranked action is to initiate an authentication process with the user. The server computer can initiate any suitable authentication process. For example, the server computer may prompt the user to provide user credentials, such as a username and/or password. In other embodiments, the server computer can request a biometric template from the user for authentication. The server can also apply filters such as "run account risk score," "determine if risk level meets cutoff," etc. which may initiate a server computer to run risk assessments on the user's accounts and respond with "your account balance is $500" if the user's account has not been compromised.

After applying the filter 519, the server computer can re-rank the actions 520. The actions can be re-ranked based on the applied filter. For example, if the filter related to filtering an unauthenticated user from accessing account data, then the server computer can re-rank the actions such that the highest ranked action is to perform user authentication.

As another example, the server computer can apply a filter related to age-appropriate content. The user may be under the age of 12. The server computer can apply a filter based on the user's indicated age. For example, the server computer can determine that some of the queried additional information does not comply with age restrictions. The server computer can then re-rank the actions 520 to perform a different action that complies with the age restrictions. For example, some or all of the queried additional information may not be included in the server computer's response.

After re-ranking the actions 520, the server computer can generate a response 521. In some embodiments, the server computer can aggregate the information retrieved from the account data database and/or the knowledge base 517. For example, if the text phrase received from the user device was "what is my account balance," the server computer can insert the account data 518 into the response, such as "your account balance is $500." In some embodiments, the server computer can generate the response using a template. For example, during unique content identification 512, the server computer can determine unique content in the text phrase and determine that the response can be of the form "your account balance is [account balance]," as described herein.

The server computer can then insert the account data 518 into the template to generate the response.

After generating the response 521, the server computer can transmit the response 522 to the user device. The server computer can transmit the response 522 to the user device in any suitable manner described herein. For example, the server computer can transmit the response 522 via a Wi-Fi communication channel.

After receiving the response from the server computer, the user device can display the response to the user via a screen display and/or other suitable output element. In some embodiments, the user can input a second text phrase relating to the response. For example, the second text phrase can be "what is my balance of account #2," "what account holders are connected to my account," or even "thank you." The second text phrase can include any suitable text. In other embodiments, the second text phrase may not relate to the response, for example, the text phrase may be "what is the weather like today," "what is the capital of Canada," "how many planets are there," and/or any other suitable text phrase.

The user device can then transmit the second text phrase to the server computer. The server computer can determine a second response to the second text phrase as described herein. For example, the server computer can perform steps 501-522.

Figure 6:
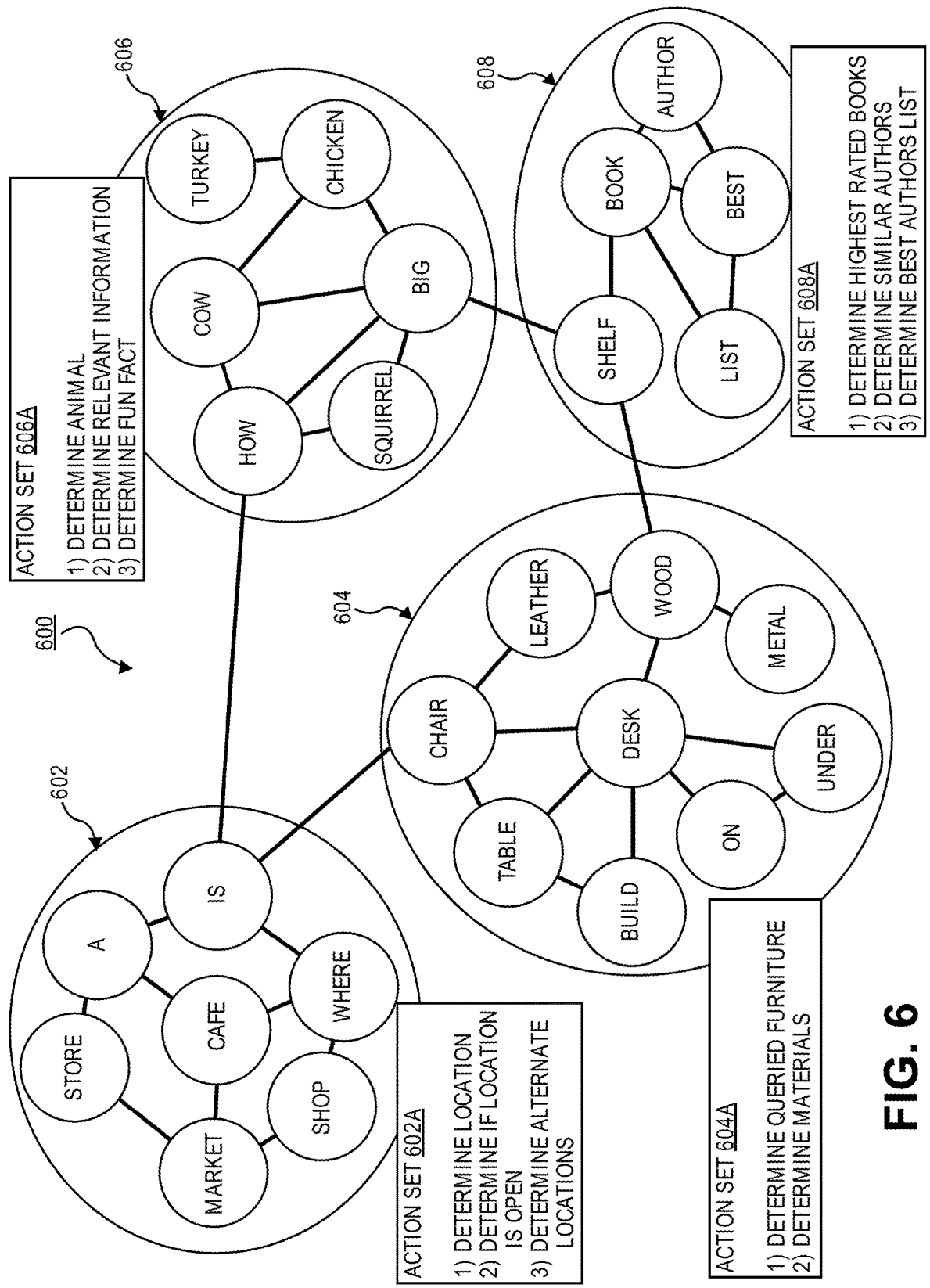
FIG. 6 shows an example graph including learned communities of language according to embodiments of the invention.

FIG. 6 shows an example graph of learned communities of language 600 according to embodiments of the invention. The graph of learned communities of language 600 comprises a number of communities. The communities include a location community 602, a furniture community 604, an animal community 606, and a literature community 608. However, it is understood that the graph of learned communities of language 600 can comprise any suitable number of learned communities, such as, 10, 75, 150, 300, 500, 2000, etc. For example, the graph of learned communities of language 600 can also comprise a geography community, a space community, a user account community, an architecture community, etc.

Each community can comprise a plurality of words. Each word may be a node in the graph of learned communities of language 600 and may be connected to other nodes by edges. A machine learning model may determine the learned communities, for example, based on the clustering of the nodes. Each learned community can be associated with an action set.

For example, the location community 602 can include the words "store," "a," "is," "where," "cafe," "shop," and "market." The action set 602A, associated with the location community 602, can include actions such as determine location, determine if location is open, and determine alternate locations.

The furniture community 604 can include the words "chair," "table," "build," "desk," "on," "under," "leather," "wood," and "metal." The action set 604A, associated with the furniture community 604, can include actions such as determine queried furniture and determine materials.

The animal community 606 can include the words "how," "squirrel," "big," "cow," "chicken," and "turkey." The action set 606A, associated with the animal community 606, can include actions such as determine animal, determine relevant information, and determine fun fact.

The literature community 608 can include the words "shelf," "book," "list," "best," and "author." The action set 608A, associated with the literature community 608, can include actions such as determine highest rated books, determine similar authors, and determine best authors list. In some embodiments, communities may overlap, such that a node (i.e., word) is located in more than one community. For example, in some embodiments, the word "shelf" may be located in both the furniture community 604 and the literature community 608.

As an example, the server computer can receive a text phrase of "list of best authors," from the user device. After parsing and normalizing the text phrase, as described herein, the server computer can determine an output shard. The server computer can determine the output shard that corresponds to a keyword found in the text phrase, for example, "authors." The output shard can be a server computer that has stored the graph of learned communities of language 600 as shown in FIG. 6. The text phrase can be routed to the output shard (i.e., server computer). In some embodiments, the server computer can determine that it is the output shard itself.

The server computer can then determine a similarity score between the vector of values of the text phrase and the communities in the community list. The community list can include the location community 602, the furniture community 604, the animal community 606, and the literature community 608. The server computer can determine that the literature community 608 is the most similar community (i.e., the literature community 608 may be representative of a vector of values most similar to the vector of values of the text phrase). The server computer can then query the action set 608A.

After querying the action set 608A from a suitable community action sets database, the server computer can rank the actions of the action set 608A. The server computer can determine that the action "determine best authors list" is most similar to the similarity score. For example, this may be due to the inclusion of the words "best," "author," and "list" in the text phrase and action. The server computer can then perform the action "determine best authors list" when querying for additional information. The additional information can include a list of best authors of 2018. The server computer can retrieve the list of best authors of 2018 from suitable knowledge base. The server computer can then determine that no filter is applicable to the retrieved additional information.

The server computer can then generate a response to the text phrase. For example, the server computer can create the response of "the most popular authors of 2018 are 1) ABC, 2) DEF, and 3) GHI." After generating the response, the server computer can transmit the response to the user device.

Several additional use cases will now be discussed. A first example can include using a chat bot to provide recommendations to users. In this example, a user can submit a text phrase asking the question "where is a good café?," which can be submitted to the server computer running the chat bot. After identifying the most similar community to the text phrase, the server computer may determine an action set that includes providing a merchant name from a list of merchants and then providing the user additional information that has been previously marked as useful. For example, the server computer may gather social media data and transaction data to identify popular merchants (e.g., most mentioned or most transacted at merchant nearby the user), and may select the top merchant. The server computer can then query for the merchants information such as its name, location, and business hours. From the community list, it may be determined that a response relating to the closing time of the business may be highly relevant. As a result, the chat bot may respond to the user with a response of "Café XYZ. FYI it closes in 57 minutes."

Another example can include using a chat bot to provide account data to users. For example, a user may submit a text phrase asking the question "what is my current balance?" A server computer running the chat bot may parse and vectorize the question to determine that it is most similar to a community relating to "inquiries about financial information/accounts." The server computer may then determine that the appropriate action should be to query for account data of the user and respond with the account balance of the user's primary account (e.g., $500).

As yet another example, a chat bot can be used to handle disputes. For example, a user may submit a claim to the chat bot relating to an unidentified charge on their financial account. The claim may include the text phrase, "I would like to dispute my XYZ purchase on 10/12/17." Upon parsing and vectorizing the text phrase, the server computer running the chat bot may determine that the text in the claim is related to the community of "user seeking chargeback with no explanation." The community may be associated with an action set for continuing with more aggressive questioning to the user. For example, the chat bot's response can be, "what is the reason?"

The user can respond to the server computer with a second text phrase. For example, the user can respond with "the XYZ purchased was not received." Upon receiving the second text phrase, the server computer can at least parse and vectorize the second text phrase, as described in FIG. 5. The server computer can determine that the second text phrase is most similar to the community of "user seeking chargeback with explanation." The community may be associated with an action set including an action of determining whether or not to allow the chargeback. The server computer may respond to the user with the outcome of whether or not the chargeback was allowed.

Embodiments of the invention have a number of advantages. For example, embodiments provide for a chat bot capable of determining responses to text phrases based on at least learned communities of language. This is beneficial over current methods of using neural networks and/or other deep machine learning methods, as the learned communities of language are more accessible to audits to verify how the chat bot will respond to users. According to embodiments, it is easier to follow a path of decisions of how the chat bot determines a response. Whereas, when using a neural network, a response will be determined based on many hidden layers and arbitrary weights in the neural network, thus making audits difficult.

Embodiments of the invention have a number of additional advantages. For example, the server computer can determine an output shard after parsing and normalizing the text phrase. Graph learning techniques can be expansive in nature with many different learned communities of language. Prior to determining a most similar community for the text phrase, the server computer can determine the output shard to limit the number of communities that the text phrase can be compared to. For example, the server computer can determine that the text phrase relates to a query regarding geography. The server computer can then determine an output shard that includes communities of language relating to geography. The server computer does not need to compare the vector of values of the text phrase to every possible community, rather only the communities stored by the shard. The server computer can more efficiently respond to the user.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
   training, by a server computer, a chat bot running at the server computer, wherein the training includes:
   obtaining, by the server computer, text data from a conversation database, the conversation database including a plurality of previous conversations, each conversation including a question, a response, and an action;
   parsing, by the server computer, using a natural language parser, the text data into a first set of distinct words;
   performing, by the server computer, using the first set of distinct words, concurrence calculation by tallying a number of times that different pairs of words from the first set of distinct words occur together in specific sentences from the text data;
   generating, by the server computer a weighted graph, the weighted graph including a plurality of nodes and a plurality of edges between the plurality of nodes, each node in the plurality of nodes representing a word from the first set of distinct words, and each edge in the plurality of edges representing a calculated concurrence between a pair of words from the first set of distinct words;
   performing, by the server computer, graph learning using a machine learning algorithm and the weighted graph, wherein the graph learning generates a plurality of learned communities of language for use by the chat bot running at the server computer, each of the plurality of learned communities of language including a subset group of nodes from the plurality of nodes in a subgraph, and each subset group of nodes representing a subset group of words from the first set of distinct words that occur together in a same context in the text data, each subset group of words including a plurality of words with different meanings, wherein the machine learning algorithm is an unsupervised graph learning algorithm for generating overlapping communities;
   storing, by the server computer, the plurality of learned communities of language for later use by the chat bot running at the server computer;
   creating, by the server computer, for each learned community of language of the plurality of learned communities of language, an association with a corresponding action set based on information from the conversation database; and
   determining, by the server computer, for each of the plurality of learned communities of language, a representative vector of values based on the subset group of words included in the learned community of language, wherein a plurality of representative vectors of values associated with the plurality of learned communities of language are available for use by the chat bot running at the server computer;
   receiving, by the chat bot running at the server computer, a text phrase from a user device operated by a user, wherein the text phrase includes a new question that is not included in the text data from the conversation database;
   predicting, by the chat bot running at the server computer, using the plurality of learned communities of language generated by the unsupervised graph learning algorithm, a response to the text phrase, wherein the predicting includes:
   parsing, by the chat bot running at the server computer, the text phrase using the natural language parser to generate a second set of distinct words;
   normalizing, by the chat bot running at the server computer, the second set of distinct words;
   determining, by the chat bot running at the server computer, an output shard based on the normalized second set of distinct words, wherein the output shard includes a subset of communities from the plurality of learned communities of language;
   generating, by the chat bot running at the server computer, a second vector of values relating to the normalized second set of distinct words;

comparing, by the chat bot running at the server computer, the second vector of values to at least one representative vector of values of at least one community in the subset of communities from the plurality of learned communities of language at the output shard;

determining, by the chat bot running at the server computer, based on the comparing, a most similar community in the plurality of learned communities of language, where the most similar community is associated with the representative vector of values that is most mathematically similar to the second vector of values;

querying, by the chat bot running at the server computer, an action set associated with the most similar community, the action set including a plurality of actions; and generating, by the chat bot running at the server computer, the response to the text phrase from the user based on the action set associated with the most similar community in the plurality of learned communities of language generated by the unsupervised graph learning algorithm, wherein steps for predicting the response to the text phrase can be monitored or reviewed by a human; and providing, by the chat bot running at the server computer, the response to the text phrase to the user device.

2. The method of claim 1 further comprising:
ranking one or more of the plurality of actions in the action set;
determining conditions for performing each of the plurality of actions based on its ranking; and
performing one or more of the plurality of actions based on the conditions.

3. The method of claim 2, wherein the one or more of the plurality of actions in the action set include query for unique content, query account data, perform a risk analysis, retrieve data from a knowledge base, and/or respond to the user.

4. The method of claim 3 further comprising:
applying a filter on the query account data.

5. The method of claim 1, wherein the second vector of values is identifiably linked to the most similar community.

6. A server computer comprising:
a processor;
a memory device; and
a computer-readable medium coupled to the processor, the computer-readable medium comprising code executable by the processor for implementing a method comprising:
training a chat bot, wherein the training includes:
obtaining text data from a conversation database, the conversation database including a plurality of previous conversations, each conversation including a question, a response, and an action;
parsing, using a natural language parser, the text data into a first set of distinct words;
performing, using the first set of distinct words, concurrence calculation by tallying a number of times that different pairs of words from the first set of distinct words occur together in specific sentences from the text data;
generating a weighted graph, the weighted graph including a plurality of nodes and a plurality of edges between the plurality of nodes, each node in the plurality of nodes representing a word from the first set of distinct words, and each edge in the plurality of edges representing a calculated concurrence between a pair of words from the first set of distinct words;
performing graph learning, using a machine learning algorithm and the weighted graph, wherein the graph learning generates a plurality of learned communities of language for use by the chat bot, each of the plurality of learned communities of language including a subset group of nodes from the plurality of nodes in a subgraph, and each subset group of nodes representing a subset group of words from the first set of distinct words that occur together in a same context in the text data, each subset group of words including a plurality of words with different meanings, wherein the machine learning algorithm is an unsupervised graph learning algorithm for generating overlapping communities;
storing the plurality of learned communities of language for later use by the chat bot;
creating, for each learned community of language of the plurality of learned communities of language, an association with a corresponding action set based on information from the conversation database; and
determining, for each of the plurality of learned communities of language, a representative vector of values based on the subset group of words included in the learned community of language, wherein a plurality of representative vectors of values associated with the plurality of learned communities of language are available for use by the chat bot;
receiving, using the chat bot, a text phrase from a user device operated by a user, and wherein the text phrase includes a new question that is not included in the text data from the conversation database;
predicting, using the chat bot and the plurality of learned communities of language generated by the unsupervised graph learning algorithm, a response to the text phrase, wherein the predicting includes:
parsing the text phrase using the natural language parser to generate a second set of distinct words;
normalizing the second set of distinct words;
determining an output shard based on the normalized second set of distinct words, wherein the output shard includes a subset of communities from the plurality of learned communities of language;
generating a second vector of values relating to the normalized second set of distinct words;
comparing the second vector of values to at least one representative vector of values of at least one community in the subset of communities from the plurality of learned communities of language at the output shard;
determining, based on the comparing, a most similar community in the plurality of learned communities of language, where the most similar community is associated with the representative vector of values that is most mathematically similar to the second vector of values;
querying an action set associated with the most similar community, the action set including a plurality of actions; and
generating the response to the text phrase from the user based on the action set associated with the most similar community in the plurality of learned communities of language generated by the unsupervised graph learning algorithm, wherein steps for predicting the response to the text phrase can be monitored or reviewed by a human; and providing, using the chat bot, the response to the text phrase to the user device.

7. The server computer of claim 6, wherein the one or more of the plurality of actions in the action set include query for unique content, query account data, perform a risk analysis, retrieve data from a knowledge base, and/or respond to the user.

8. The server computer of claim 6, wherein the same context includes a set of similar sentences.

9. The server computer of claim 6, wherein the text data is first text data, and further comprising:

obtaining second text data from a lexical database, the lexical database including information about lexemes of a language, wherein performing the concurrence calculation includes combining tallies for different words of a lexeme as indicated by the second text data.

10. The server computer of claim 6, wherein generating a vector of values relating to the normalized second set of distinct words is based on a conversion table from words to identifiers, wherein the second vector of values relating to the normalized second set of distinct words includes a unique identifier representing each of the normalized second set of distinct words.

11. A method comprising:

transmitting, by a user device, a text phrase to a server computer, wherein the server computer trains a chat bot, wherein training includes obtaining text data from a conversation database including a plurality of previous conversations, each conversation including a question, a response, and an action, parsing the text data into a first set of distinct words using a natural language parser, performing concurrence calculation by tallying a number of times that different pairs of words from the first set of distinct words occur together in specific sentences, generating a weighted graph including a plurality of nodes and a plurality of edges between the plurality of nodes, each node in the plurality of nodes representing a word from the first set of distinct words, and each edge in the plurality of edges representing a calculated concurrence between a pair of words from the first set of distinct words, performing graph learning using a machine learning algorithm and the weighted graph, wherein the graph learning generates a plurality of learned communities of language for use by the chat bot, each of the plurality of learned communities of language including a subset group of nodes from the plurality of nodes in a subgraph, and each subset group of nodes representing a subset group of words from the first set of distinct words that occur together in a same context in the text data, each subset group of words including a plurality of words with different meanings, wherein the machine learning algorithm is an unsupervised graph learning algorithm for generating overlapping communities, storing the plurality of learned communities of language for later use by the chat bot, creating, for each learned community of language of the plurality of learned communities of language, an association with a corresponding action set based on information from the conversation database, and determining, for each of the plurality of learned communities of language, a representative vector of values based on the subset group of words included in the learned community of language, wherein a plurality of representative vectors of values associated with the plurality of learned communities of language are available for use by the chat bot, wherein the server computer uses the chat bot to receive the text phrase from the user device, wherein text phrase includes a new question that is not included in the text data from the conversation database, wherein the server computer uses the chat bot and the plurality of learned communities of language generated by the unsupervised graph learning algorithm to predict a response to the text phrase, wherein predicting includes parsing the text phrase using the natural language parser to generate a second set of distinct words, normalizing the second set of distinct words, determining an output shard based on the normalized second set of distinct words, wherein the output shard includes a subset of communities from the plurality of learned communities of language, generating a second vector of values relating to the normalized second set of distinct words, comparing the second vector of values to at least one representative vector of values of at least one community in the subset of communities from the plurality of learned communities of language at the output shard, determining a most similar community in the plurality of learned communities of language, where the most similar community is associated with the representative vector of values that is most mathematically similar to the second vector of values, wherein the most similar community corresponds to the text phrase, querying an action set associated with the most similar community, and generating the response to the text phrase based on the action set; and receiving, by the user device, the response to the text phrase from the server computer.

12. The method of claim 11 further comprising:

receiving, by the user device from a user, a second text phrase relating to the response; and transmitting, by the user device, the second text phrase to the server computer.

13. The method of claim 11, wherein the server computer further ranks a plurality of actions of the action set and queries additional information based on the plurality of actions of the action set.

14. A user device comprising:

a processor;

a memory device; and a computer-readable medium coupled to the processor, the computer-readable medium comprising code executable by the processor for implementing a method comprising:

transmitting a text phrase to a server computer, wherein the server computer trains a chat bot, wherein training includes obtaining text data from a conversation database including a plurality of previous conversations, each conversation including a question, a response, and an action, parsing the text data into a first set of distinct words using a natural language parser, performing concurrence calculation by tallying a number of times that different pairs of words from the first set of distinct words occur together in specific sentences, generating a weighted graph including a plurality of nodes and a plurality of edges between the plurality of nodes, each node in the plurality of nodes representing a word from the first set of distinct words, and each edge in the plurality of edges representing a calculated concurrence between a pair of words from the first set of distinct words, performing graph learning using a machine learning algorithm and the weighted graph, wherein the graph learning generates a plurality of learned communities of language for use by the chat bot, each of the plurality of learned communities of language including a subset group of nodes from the plurality of nodes in a subgraph, and each subset group of nodes representing a subset group of words from the first set of distinct words that occur together in a same context in the text data, each subset group of words including a plurality of words with different meanings, wherein the machine learning algorithm is an unsupervised graph learning algorithm for generating overlapping communities, storing the plurality of learned communities of language for later use by the chat bot, creating, for each learned community of language of the plurality of learned communities of language, an association with a corresponding action set based on information from the conversation database, and determining, for each of the plurality of learned communities of language, a representative vector of values based on the subset group of words included in the learned community of language, wherein a plurality of representative vectors of values associated with the plurality of learned communities of language are available for use by the chat bot, wherein the server computer uses the chat bot to receive the text phrase from the user device, wherein text phrase includes a new question that is not included in the text data from the conversation database, wherein the server computer uses the chat bot and the plurality of learned communities of language generated by the unsupervised graph learning algorithm to predict a response to the text phrase, wherein predicting includes parsing the text phrase using the natural language parser to generate a second set of distinct words, normalizing the second set of distinct words, determining an output shard based on the normalized second set of distinct words, wherein the output shard includes a subset of communities from the plurality of learned communities of language, generating a second vector of values relating to the normalized second set of distinct words, comparing the second vector of values to at least one representative vector of values of at least one community in the subset of communities from the plurality of learned communities of language at the output shard, determining a most similar community in the plurality of learned communities of language, where the most similar community is associated with the representative vector of values that is most mathematically similar to the second vector of values, wherein the most similar community corresponds to the text phrase, querying an action set associated with the most similar community, and generating the response to the text phrase based on the action set; and receiving the response to the text phrase from the server computer.

15. The method of claim 1, wherein the plurality of learned communities of language include a location community, a furniture community, an animal community, and a literature community.

16. The method of claim 1, wherein each of the plurality of learned communities of language further includes a subset group of edges from the plurality of edges, the subset group of edges being between the subset group of nodes.

17. The method of claim 1, wherein determining the representative vector of values based on the subset group of words included in the learned community of language includes determining an average vector from a set of vectors corresponding to the subset group of words.

18. The method of claim 1, wherein the text data is training data for the machine learning algorithm.

* * * * *